US011522600B1

(12) United States Patent
Rakib

(10) Patent No.: US 11,522,600 B1
(45) Date of Patent: Dec. 6, 2022

(54) AIRBORNE RF-HEAD SYSTEM

(71) Applicant: Shlomo Selim Rakib, Saratoga, CA (US)

(72) Inventor: Shlomo Selim Rakib, Saratoga, CA (US)

(73) Assignee: Cohere Technologies, Inc., San Jose, CA (US)

( * ) Notice: Subject to any disclaimer, the term of this patent is extended or adjusted under 35 U.S.C. 154(b) by 702 days.

(21) Appl. No.: 16/529,723

(22) Filed: Aug. 1, 2019

Related U.S. Application Data

(60) Provisional application No. 62/722,327, filed on Aug. 24, 2018, provisional application No. 62/713,469, filed on Aug. 1, 2018.

(51) Int. Cl.
| | |
|---|---|
| *H04B 7/06* | (2006.01) |
| *H04B 7/155* | (2006.01) |
| *H04B 7/185* | (2006.01) |
| *B64C 39/02* | (2006.01) |
| *B64B 1/40* | (2006.01) |
| *H04W 88/08* | (2009.01) |

(52) U.S. Cl.
CPC .......... *H04B 7/18504* (2013.01); *B64B 1/40* (2013.01); *B64C 39/024* (2013.01); *H04B 7/0613* (2013.01); *H04B 7/155* (2013.01); *H04W 88/085* (2013.01); *B64C 2201/027* (2013.01)

(58) Field of Classification Search
CPC ... B64B 1/40; B64C 39/024; B64C 2201/027; H04B 7/155; H04B 7/15507; H04B 7/185; H04B 7/18502; H04B 7/18504
See application file for complete search history.

(56) References Cited

U.S. PATENT DOCUMENTS

| | | | |
|---|---|---|---|
| 6,628,941 B2 | 9/2003 | Knoblach et al. | |
| 7,151,925 B2 | 12/2006 | Ting et al. | |
| 7,558,574 B2 * | 7/2009 | Feher | H04L 27/0008 370/335 |

(Continued)

OTHER PUBLICATIONS

Harris, F.J., "Digital Receivers and Transmitters Using Polyphase Filter Banks for Wireless Communications", IEEE transactions vol. 51 (4), Apr. 2003, pp. 1395-1412 (entire document).

*Primary Examiner* — Alpus Hsu
(74) *Attorney, Agent, or Firm* — Stephen E. Zweig

(57) ABSTRACT

An airborne RF-head platform system and method. Here, much of the computational burden of transmitting and receiving wireless RF waveforms is shifted from the airborne platform to a ground baseband unit (BBU). The airborne platform, which will often be a high altitude balloon or drone type platform, generally comprises one or more remote radio heads, configured with antennas, A/D and D/A converters, frequency converters, RF amplifiers, and the like. The airborne platform communicates with the ground baseband units either directly via a laser communications link, or indirectly through another airborne relay platform. The airborne RF-head communicates via various wireless protocols to various user equipment such as smartphones by using the BBU and the laser communications link to precisely control the function of the airborne A/D and D/A converters and antennas. This system reduces the power needs, weight, and cost of the airborne platform, and also improves operational flexibility.

20 Claims, 6 Drawing Sheets

(56) References Cited

U.S. PATENT DOCUMENTS

| | | | |
|---|---|---|---|
| 8,050,708 B2 | 11/2011 | March et al. | |
| 8,565,811 B2 | 10/2013 | Tan et al. | |
| 8,571,119 B2 | 10/2013 | Naik et al. | |
| 9,319,827 B2 | 4/2016 | Lin et al. | |
| 9,632,503 B2 | 4/2017 | Knoblach et al. | |
| 9,643,706 B2 | 5/2017 | Knoblach et al. | |
| 9,678,193 B2 | 6/2017 | Knoblach et al. | |
| 9,893,774 B2* | 2/2018 | Shattil | H04W 24/00 |
| 2015/0051880 A1* | 2/2015 | Arditti | H04B 1/123 |
| | | | 703/2 |
| 2016/0223643 A1* | 8/2016 | Li | G01S 7/0236 |
| 2017/0054482 A1* | 2/2017 | Forenza | H04B 7/0626 |
| 2018/0076515 A1* | 3/2018 | Perlman | H04B 1/38 |
| 2018/0279133 A1* | 9/2018 | Gayrard | H04W 48/06 |
| 2019/0334621 A1* | 10/2019 | Goodwill | H04B 10/25752 |

\* cited by examiner

AIRBORNE RF-HEAD SYSTEM

CROSS REFERENCE TO RELATED APPLICATIONS

This application claims the priority benefit of U.S. provisional application 62/713,469 filed Aug. 1, 2018 and U.S. provisional application 62/722,327 filed Aug. 24, 2018; the entire contents of these applications are incorporated herein by reference.

BACKGROUND OF THE INVENTION

Field of the Invention

The invention is in the field of software-defined radio, remote radio head and baseband unit technology, and airborne wireless relay methods.

Description of the Related Art

In recent years, there has been an interest in using high-altitude balloons and high altitude drones to further extend wireless communications and Internet access to wider areas of the world. Such methods have included the Facebook Aquila system, the Space Data Corporation balloon-constellation methods, exemplified by Knoblach, U.S. Pat. Nos. 6,628,941, 9,632,503, 9,643,706, 9,678,193, and the like. Google has also been active in this field through their project Loon system.

Software-Defined Radio

As digital electronics has advanced, it has become increasingly feasible to implement traditional wireless or radio hardware (e.g. detectors, filters, oscillators, amplifiers, mixers, modulators, demodulators and the like) digitally. Instead of these earlier analog devices, now these formerly analog operations can be done digitally (e.g. mathematically) by the use of various types of computer processors (e.g. microprocessors), digital signal processors, and the like, often controlled by software. Since wireless signals, even when carrying digital data, are essentially analog waveforms, to translate between the digital/mathematical realm used by the processors, and the analog world of the various radiofrequency (RF) waveforms, various types of converter devices are used. These converter devices include analog to digital converters, digital to analog converters, as well as other types of converters such as digital I/Q modulators and I/Q demodulators, digital QAM modulators and demodulators and the like.

Examples of such software radio techniques are exemplified by the work of Harris, "*Digital Receivers and Transmitters Using Polyphase Filter Banks for Wireless Communications*", IEEE transactions volume 51 (4), April 2003, pages 1395-1412. Application specific integrated circuits (ASICs) and other types of devices and methods may also be used for this type of work, and these can be viewed as being another type of processor.

Software radio methods are feasible because modern converters, such as high speed A/D converters, can operate in a broadband mode and at very high (GHz range) speeds. For example, the Texas Instruments TI ADC12Dxx00RF family of A/D converters can sample with 12-bit resolution at frequencies of 2.7 GHz and greater, and at rates of 3.6 gigasamples per second (GSPS). As another example, Fujitsu Microelectronics America, Inc. produces a 56 GSPS 8-bit A/D converter. Various types of wideband amplifiers and timers are also available to match this capability. It is likely that with further advances in electronics, more capable A/D and D/A converters, digital signal processors, and the like, will become available.

Other examples of various types of prior-art software-defined radio technology include the work of Tan et. al., U.S. Pat. No. 8,565,811; Ting et. al., U.S. Pat. No. 7,151,925; March et. al., U.S. Pat. No. 8,050,708; and Naik et. al., U.S. Pat. No. 8,571,119; the entire contents of these applications are incorporated herein by reference.

Cloud-RAN (C-RAN) methods are described by Llyadis, U.S. Pat. No. 9,313,827, Yuk, WIPO patent application WO2013125918, and other inventors. The entire contents of U.S. Pat. No. 9,313,827 and WO2013125918 are incorporated herein by reference.

BRIEF SUMMARY OF THE INVENTION

Prior art high altitude airborne wireless relay systems, such as the Aquila, Space Data Corporation, and Loon systems typically attempted to put entire wireless transceiver systems at high altitude. In order to be economically feasible, such high altitude platforms must be very lightweight, must loiter at high altitude for long periods of time (preferably days, weeks, or months at a time), and generally must operate using limited energy solar power/battery backup system. Further, such airborne platforms are often lost or damaged, making it economically disadvantageous to use expensive components in these systems.

The invention is based, in part, on the insight that a significant amount of expense and energy of such airborne wireless relay systems can be reduced if a C-RAN/Cloud-RAN type approach was adopted where the radio transceiver function was separated into two different components:

1) An airborne remote radio head end equipped with wireless circuitry such as antennas and suitable radiofrequency digital to analog (D/A) and analog to digital (A/D) converters), up/down converters, amplifiers and the like.

2) A separate and usually non-airborne (e.g. often ground or ship based) baseband unit configured to do almost all of the other system functions, including implementing the large computational overhead needed to implement software defined radio, MIMO, CoMP, and other functions.

Separating these two functions would reduce the power and cost of the airborne wireless relay platform, while at the same time introducing additional system flexibility. However prior art C-RAN/Cloud-RAN systems had a big advantage, in that the distance between the radio head end and the baseband unit was normally both fixed and precisely known, and the head end and baseband units were usually connected by a physical media such as optical fiber or cable. By contrast, if such a distributed approach were to be used for an airborne platform, a number of problems would have to be addressed. In particular, the distance between the airborne platform based remote radio head and the baseband unit would not be nearly as well defined or constant as it would for a ground-based C-RAN system, and additionally it generally not be feasible to use optical fiber, cable, or other physical media to connect the airborne platform based radio head with the (often groundbased) baseband unit.

In the present invention, an airborne RF-head in laser communication with a baseband unit (base station) is described. This platform may be either tethered or untethered, and may be a balloon, tethered balloon, heavier than air flying machine (e.g. a drone), again in either a tethered or untethered configurations. Note that although in some embodiments, the platform may operate in the stratosphere, in other embodiments, the platform may operate at much lower altitudes, such as only a few hundred feet. Often the RF-head will receive and transmit digitized-wireless waveform with the baseband unit. Here, as a specific example, we will often talk of using transmitting (Tx) I/Q digital data, and receiving (Rx) I/Q digital data. When we talk of receiving and transmitting actual wireless (RF) waveforms, we will use the term Tx (transmitting) RF waveform signals, and Rx (receiving) RF waveform signals.

In the tethered configuration, the laser communications link may be an optical fiber link. However, the weight of such a tether becomes impractical as the altitude of the platform increases. Thus more generally, for high altitude (e.g. stratospheric) configurations, an "over the air" (e.g. direct laser link without any optical fiber cable or any medium other than empty space) laser link is described.

In some embodiments, the baseband unit may adjust it's I/Q (or other type) digital data for variations in the airborne RF-head's location and orientation. Here we will disclose how the baseband unit can communicate with multiple airborne (e.g. flying) RF-heads, as well as describe airborne RF-heads and baseband units that implement MIMO, CoMP, and other functions. We will also disclose with multiple MIMO-airborne RF-heads, airborne-RF heads that can relay data between other airborne RF-heads (by laser or RF signals), and baseband units that can manage such relays. As needed, the system may be further configured with multiple units and relays to form a mesh network.

DETAILED DESCRIPTION OF THE INVENTION

Figure 1:
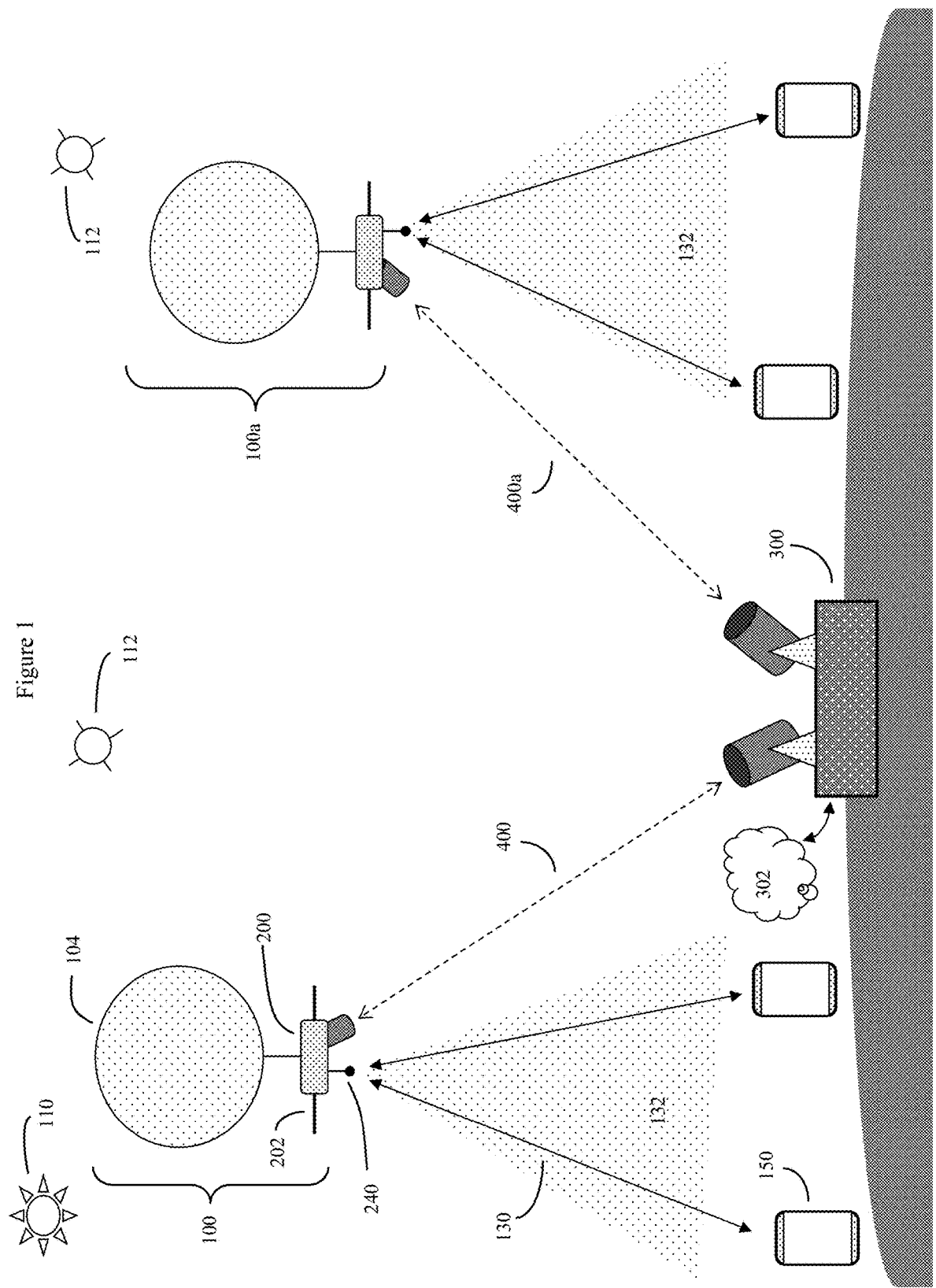
FIG. 1 shows an example of an airborne RF-head system with two airborne RF-head platforms (here shown as balloon based platforms) and one baseband unit (BBU) located on the ground.

In some embodiments, the invention may be viewed as being an airborne RF-head system. This system will typically comprise at least one airborne RF-head platform (100) comprising at least one RF head (200), and an airborne platform (104) comprising any of a mobile balloon or aircraft device (such as a drone) configured to operate within earth's atmosphere. This at least one RF head will typically be connected to at least one antenna (240). This at least one RF head (200) is typically further configured to connect to at least one baseband unit (BBU) (300) by a laser communications link (400). This airborne RF-head system (100) is configured to receive Rx RF waveform (e.g. radiofrequency waveform) signals (130) such as cellular wireless signals) from at least one user equipment (UE) (150, such as cellular telephones) by using the at least one antenna (240) and the at least one RF head (200) to receive the Rx RF waveform signals (130), convert them to Rx digitized-waveform data (for example Rx I/Q digital data), and to transmit (essentially retransmitting) these Rx digitized-waveform data version of the original Rx RF waveform signals directly or indirectly to the baseband unit (300) using the laser communications link (400).

Similarly, the invention's airborne RF-head system (100) is also configured to transmit Tx RF waveform signals from the at least one baseband unit to the various user equipment (150) by using the at least one baseband unit (300) to first create Tx digitized-waveform data (for example Tx I/Q digital data), and transmit this Tx digitized-waveform data directly or indirectly from the baseband unit (300) to the airborne RF-head platform (100) using the laser communications link (400), and then using the at least one RF head (200) and the at least one antenna (240) to convert this Tx digitized-waveform data to Tx RF waveform signals (such as cellular wireless signals), and transmit the Tx RF waveform signals to the various user equipment (150).

FIG. 1 shows an example of this airborne RF-head system. Here there are two airborne RF-head platforms (100, 100*a*) (here shown as balloon 104 based platforms) and one baseband unit (BBU) (300) located on the ground. In this embodiment, the two airborne RF-heads platforms (100, 100*a*) are powered by a combination of solar photovoltaic cells (202) which collect power from the sun (110), and supplemental platform batteries (not shown). In this embodiment, each airborne RF-head platform (100, 100*a*) is equipped with an omnidirectional antenna (240), allowing. The net result of this system is that when operational, the various airborne RF-heads (100, 100*a*) can transmit and receive wireless (e.g. RF waveform) signals from various types of user equipment (UE, 150) within range of that particular RF-head platform (100, 100*a*), and this in turn can be communicated to the baseband unit (BBU 300) over the laser link (400). In this example, the user equipment (150) is exemplified as various wireless smartphones.

Note that in FIG. 1, the antenna (240) is either an omnidirectional antenna (or an antenna with a wide beam dispersion so that can send and receive wireless signals over a broad range of angles and locations). This broad range, single antenna beam, configuration is symbolized by the wide dotted area (132, 132*a*).

In addition to the previously discussed antenna(s) (204) and solar cells (202), the RF-head (200) will typically further comprise various devices including any of power amplifiers, analog to digital converters, digital to analog converts, frequency down-converters, frequency up-converters, and other devices which will be discussed in more detail shortly.

As previously discussed, according to the invention, each airborne RF-head platform (100, 100*a*) has a laser communications link (400) with a baseband unit (BBU) (300), here showed as a baseband unit ground station. Note that this particular ground station location is not intended to be limiting—the BBU can be located in other locations on land, sea, air or even space, and can be either mobile or fixed. For simplicity, however, this discussion will focus on BBU that are based on fixed land positions.

This baseband unit (BBU 300) is in turn connected to other networks such as various wireless carriers, the internet, and the like, here symbolized by the Internet "cloud" (302). Indeed, in some configurations, the system may be configured to implement a Common Public Radio Interface (CPRI) specification or standard enabling a large number of potentially interested wireless carriers and vendors to share use of the system. At present, the latest version of the CPRI standard is CPRI 7.0, and eCPRI 1.2, with eCPRI 2.0 presently under development. Alternatively, the CPRI or eCPRI specifications and standards may be modified improve compatibility with the present invention.

The laser link (400) may have enough bandwidth to send and receive various analog RF-waveforms received by the platform (130) from the UE (150), or transmitted by the platform to the UE, without any need for digitization at all.

However, often the BBU (300) will use the laser link (400) to send and receive digitized forms of the RF waveforms (130) received by the platform from the UE, and transmitted by the platform to the UE. This is termed "digitized-waveform data". These digitized forms capture the underlying shape of the RF waveform in digital form, often with some compression. For example, as a brute force approach, the RF waveforms can be digitized using high-speed A/D and D/A waveforms using Nyquist sampling (often at twice the highest frequency of the underlying signal carried by the RF waveform carrier wave). However other, and often more efficient, ways to digitize RF waveforms can be used. For example, use of I/Q type digitized RF-waveforms is relatively efficient and will be used as the main example of digitized-waveform data through this document. Thus as one alternative, when I/Q methods are used, the received digitized waveform data (Rx digitized-waveform data) can be termed Rx I/Q data, while the transmitted digitized waveform data (Tx digitized-waveform data) can be termed Tx I/Q data.

In addition to the various received and transmitted RF-waveforms to and from the UE, the laser link (400) may also be used to transmit various types of control signals to help the baseband unit (BBU 300) better manage and control the various airborne RF-head platforms (100, 100a). This will be discussed in more detail shortly.

Note that in FIG. 1, the baseband unit (BBU 300) is configured to implement laser communications links (400, 400a) to more than one airborne RF-head platforms (100, 100a).

Figure 2:
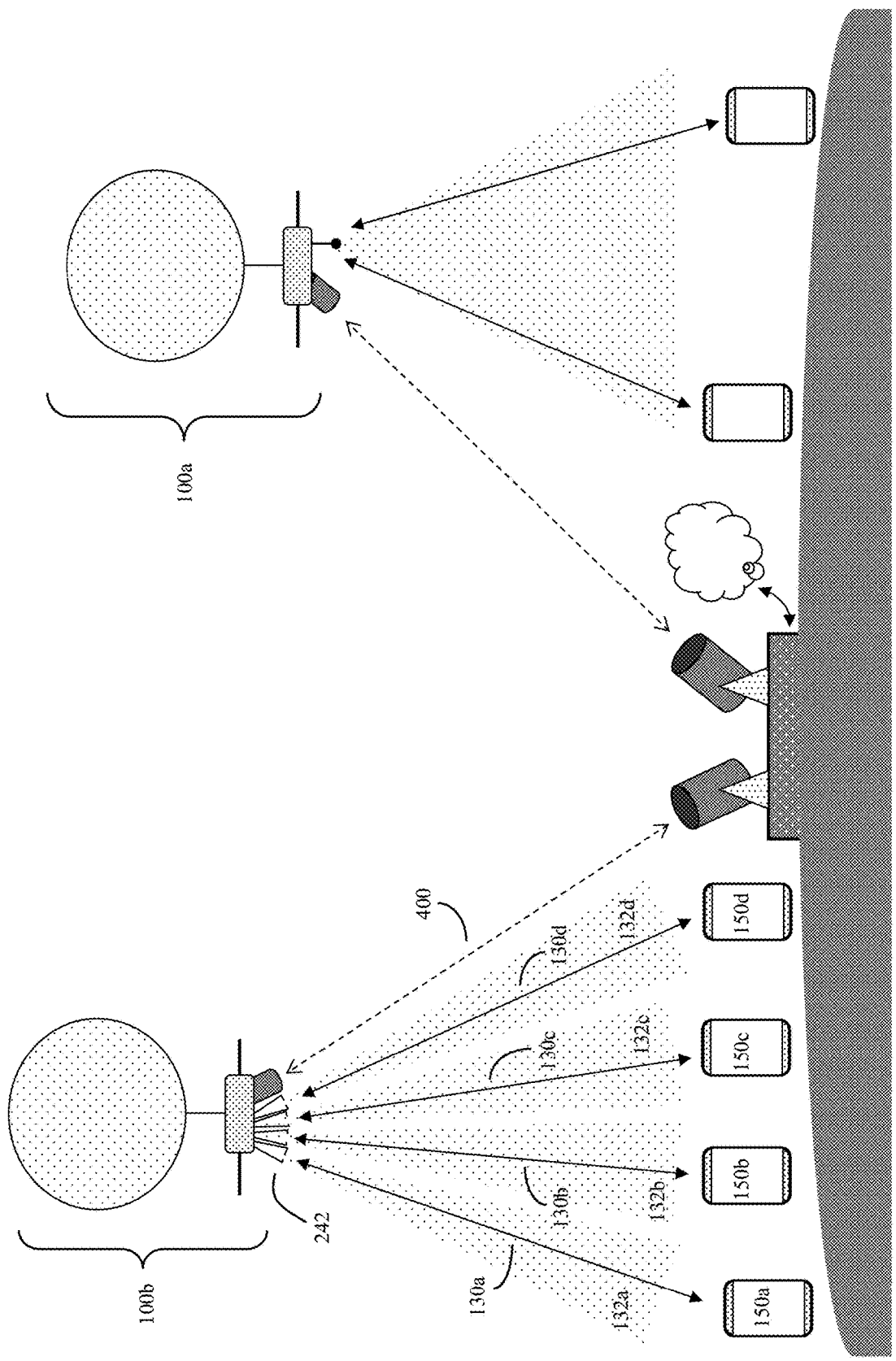
FIG. 2 shows that in a preferred embodiment, the airborne RF-head platform will be configured with a plurality of RF-heads and a plurality of antennas, often configured in a MIMO (multiple-input and multiple-output) system.
Figure 5:
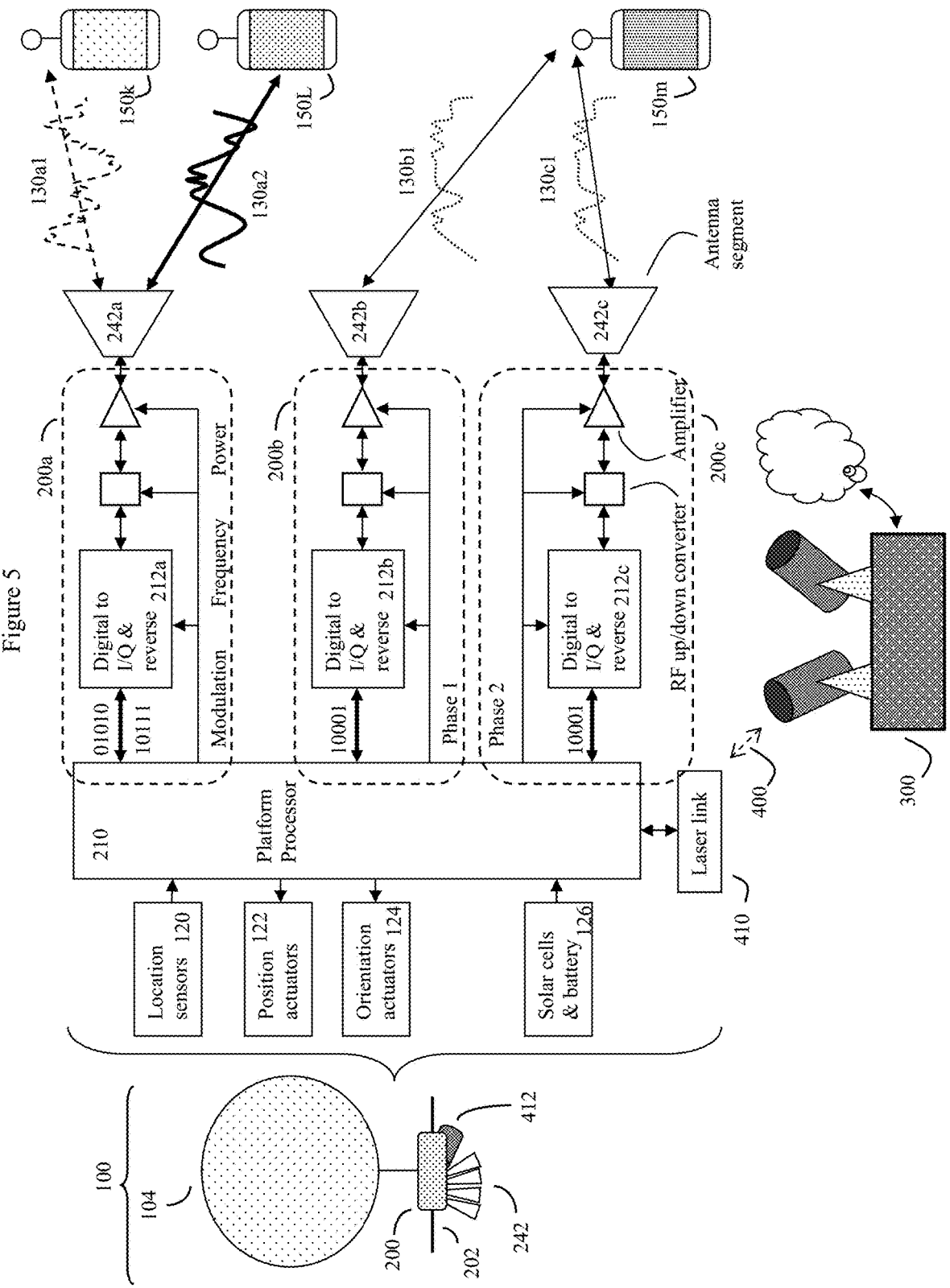
FIG. 5 shows further details of one embodiment of the airborne RF-head platform, here focusing on some of the RF-head and platform control electronics.

As shown in FIG. 2, as well as in more detail in FIG. 5, in some embodiments, the airborne RF-head platform (100b) can be configured to use a plurality of physical wideband antennas (242). Typically each of these physical wideband antennas are configured with their own, antenna specific, wideband converters. See FIG. 5 for more discussion.

As per the previous example, these various wideband converters onboard the airborne RF-head relay platform(s) (100b) will be generally controlled by, and exchange data over the laser communications link (400) with, a BBU (300) comprising at least one BBU processor and memory. This BBU processor and memory will typically be configured to implement various software-defined radio schemes, such as previously discussed methods of Harris and other wireless (radio) schemes. See FIG. 6 for more discussion.

Each airborne RF-head system (100) will typically be configured to determine its present location and orientation. This can be done by various methods and devices, such by use of various position sensors, orientation sensors onboard the platform (100). Additionally, the laser communications link (400), or lasers used in that link, can also be used to help determine relative distances between the location of the various airborne RF-head platforms (100, 100a, 100b, etc.) which will tend to vary somewhat, and the BBU ground station (300) which will generally be previously determined using standard positioning methods. Examples of directly using the laser communications link (400) to establish platform location (100) can include measuring the time of flight of the laser beam, computing angles of laser used in the laser link, and the like.

In some embodiments, the airborne RF-head systems can be equipped with global positioning system (GPS) receiver devices that can use various GPS (112) satellites to help determine the position of the airborne RF-head platform (100, 100a, 100b) very precisely. That is, the GPS receiver can determine the position of the platform (100), which can then report its position to the BBU ground station (300) using the laser link (400) to send the position data. This location information can be used by the BBU (300) to help to correct the RF waveforms for differences in the distance between the airborne RF head platform (100) and the BBU (300), differences in the distance between the airborne RF head platform (100), the BBU (300), and the user equipment (150) (also caused by speed of light issues), as also correct for any Doppler effects (caused by the platform (100) moving with respect to the BBU (300) and/or the user equipment (150), different angles, different amounts of expected RF signal attenuation, and the like.

Thus in some embodiments of the invention, the at least one baseband unit (300) may be configured to use the laser communications link (400) to obtain a platform location of at least one airborne RF-head platform (100, 100a, 100b), thus obtaining platform location information. Here typically this at least one baseband unit (300) will have a BBU location, and corresponding BBU location information. In this embodiment, the at least one baseband unit (300) (e.g. a BBU processor) is configured to use this BBU location information, and the platform location information, to determine at least at least platform-to-BBU distance information.

This at least one baseband unit (300) can be is further configured to use at least the platform (100)-to-BBU (300) distance information to adjust any of its Rx digitized-waveform data or Tx digitized-waveform data to correct for variations in at least the platform-to-BBU distance between the respective airborne RF-head platform (100) and the baseband unit (300).

As previously discussed, the distance between the BBU (300) and the airborne RF head platform (e.g. 100) can be determined by various systems and methods. In one embodiment, again as previously discussed, a baseband unit (300) can be configured to use the laser communications link (400) to also obtain an orientation of the airborne RF-head platform (100) of interest, thus producing platform orientation information. This laser communications link (400) may itself be used to make this location and distance determination, or alternatively can be merely used to carry information (e.g. GPS location) information pertaining to the location of the airborne RF-head platform (100) back to the BBU (300) using the laser link (400) as one way to carry this data. The location data could, of course, be sent by other methods, such as a direct RF wireless signal (not shown) between the airborne RF-head platform (100) and the BBU (300).

In this embodiment, the baseband unit (300) can be further configured to use any of the Rx digitized-waveform data or Tx digitized-waveform data, the BBU location information, the airborne RF-head platform location information, and the airborne RF-head platform orientation information (e.g. what direction the airborne RF-head platform is facing) to determine a location of various user equipment of interest (150). This can be used to produce user equipment location information. For example, the BBU processor can use trigonometry to factor in the directional sensitivity of the airborne RF-head antennas, the orientation of the airborne RF-head platform, and various distances (determined by speed-of-light calculations) to calculate the location of the user equipment. Alternatively, of course, the user equipment may report its location directly, or other methods of estimating the location of the user equipment may also be used.

Regardless of how the equipment location information is obtained, the baseband unit (300) can be configured to adjust any of its Rx digitized-waveform data or Tx digitized-waveform data to correct for variations in any of the location and orientation between the airborne RF-head platform (100, 100*a*, 100*b*) and the various user equipment (150).

Returning to FIG. 2, FIG. 2 also shows that in a preferred embodiment, the airborne RF-head platform (100*b*) can be configured with a plurality of RF-heads and a plurality of antennas (242). See also FIG. 5. These can often be configured to produce a MIMO (multiple-input and multiple-output) system where the multiple antennas can be used to, for example, implement beamforming methods, producing beams. These beamforming methods can be used, for example, to create more directionally focused wireless beams (132*a*, 132*b*, 132*c*, 132*d*) that enable a larger number of UE (150*a*, 150*b*, 150*c*, 150*d*), located in different locations near that particular airborne RF-head, to more efficiently utilize the limited RF-spectrum available for such wireless communication. In FIG. 2, wireless links (130*a*, 130*b*, 130*c*, 130*d*) may, due to these MIMO beamforming methods, all simultaneously use the same frequencies and time slots.

Thus in this embodiment, the airborne RF-head platform (100*b*) is configured with a plurality of RF heads and a plurality of antennas, at least some of the RF heads connected to at least one of the plurality of antennas. To support these multiple RF heads and plurality of antennas, the baseband unit (300) is typically further configured to send and receive multiple streams of the various Rx digitized-waveform data and various Tx digitized-waveform data. This lets the system to implement a MIMO configuration, the various airborne RF-head platforms (such as 100*b*) to use MIMO beam focusing techniques to create multiple wireless beams (132*a*, 132*b*, 132*c*, 132*d*) to simultaneously communicate with multiple spatially distributed user equipment (such as 150*a*, 150*b*, 150*c*, 150*d*) over any of a same or different RF communications channel (such as any of 130*a*, 130*b*, 130*c*, 130*d*).

As a result, by using MIMO beamforming methods, the same RF frequencies and time slots can be reused between spatially separated UE (150*a*, 150*b*, 150*c*, 150*d*) located in different MIMO beams (132*a*, 132*b*, 132*c*, 132*d*). Note that according to the invention, not all airborne RF-heads need to be configured identically. Some, such as those over regions with a higher number of spatially separated UE (such as urban areas) may use airborne RF-head platforms (100*b*) with multiple antennas and MIMO methods. Others, such as those over more regions with a lower number of spatially separated UE (such as rural areas) may utilize different methods, such as airborne RF-head platforms with non-MIMO antennas, or even omnidirectional antennas such as (100 or 100*a*).

Figure 3:
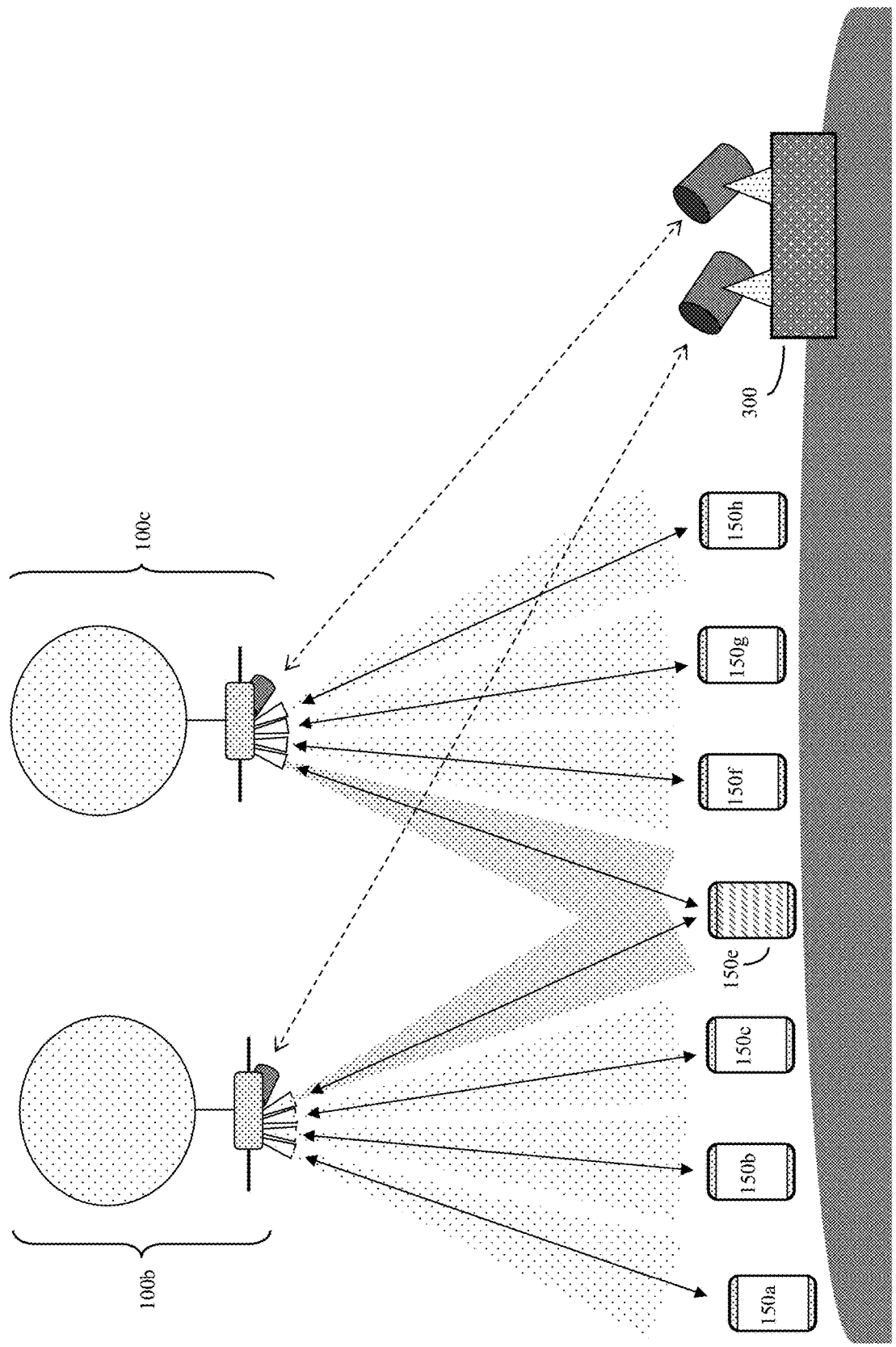
FIG. 3 shows that in some embodiments, different airborne RF-head platforms can operate in a coordinated manner to provide service to the same user equipment (UE).

FIG. 3 shows that in some embodiments, different airborne RF-head platforms (100*b*, 100*c*) can operate in a coordinated manner to provide service to the same user equipment (UE). In this example, two airborne RF-head platforms (100*b*, 100*c*), each equipped with multiple RF-heads and multiple antennas, and each equipped to implement MIMO methods, are implementing a coordinated multipoint (CoMP) configuration where a particular smartphone UE (150*e*) is simultaneously communicating (exchanging radiofrequency signals and data) with both airborne RF head platforms. This type of configuration is particularly useful for handling user equipment that is located near the boundaries between good wireless communication between a first airborne RF-head platform (such as 100*b*) and one or more other airborne RF-head platforms (such as 100*e*).

Thus in some embodiments, the at least one airborne RF-head platform can be a plurality of airborne RF-head platforms (e.g. 100*b*, 100*c*), and the at least one user equipment can be a plurality of user equipment (150*a*, 150*b*, 150*c*, 150*e*, 150*f*, 150*g*, 150*h*) distributed over different spatial locations. Here, the at least one baseband unit (300) can be configured to send multiple streams of Rx digitized-waveform data and Tx digitized-waveform data to implement a plurality of MIMO configurations over this plurality of airborne RF-head platforms. This lets the system implement a coordinated multipoint (CoMP) configuration where at least some of the various user equipment (such as 150*e*) simultaneously exchanges Rx RF waveform signals and Tx RF waveform signals with more than one airborne RF-head platforms (here 100*b* and 100*c*).

Figure 4:
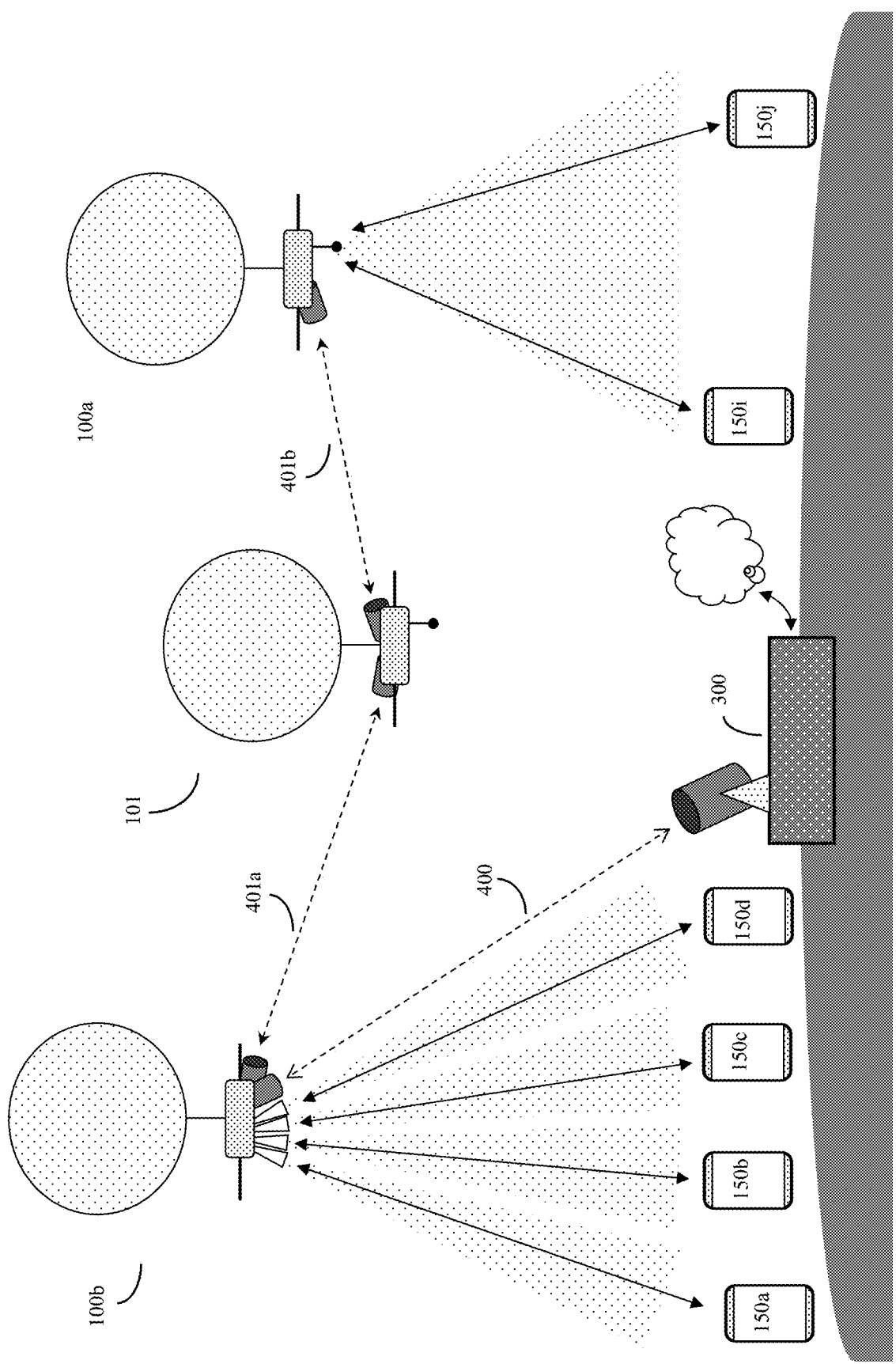
FIG. 4 shows that in some embodiments, it may be useful to also employ various airborne RF-head relay platforms.

FIG. 4 shows that in some embodiments, it may be useful to also employ various airborne RF-head relay platforms (e.g. airborne RF-head relay platform 101) to extend coverage to airborne RF-head platforms that may not be able to form laser communication links with suitable baseband units (BBU 300).

In FIG. 4, assume that the baseband unit (300) is within laser communications range of a first airborne RF-head platform (100*b*), but not within laser communications range of a second airborne RF-head platform (100*a*). Here, an airborne RF-head relay platform (101) can be used to solve this problem. The ground-based BBU unit (300) is in communication with the first airborne RF-head platform (100*b*), the first airborne RF-platform is, in turn, sending data to the airborne RF-head relay platform (101), which in turn is sending data to the second airborne RF-head platform (100*a*). Data can be relayed using air-to-air laser relay communications links, or alternatively using air-to-air wireless relay communications links.

Note that in FIG. 4, the first and second airborne RF-head platforms (100*b* and 100*a*) are assumed to be configured to send and receive data to other airborne platforms, while also being configured to maintain communications with the BBU ground station (300) and the various user equipment (UE) (150*a*, 150*b*, 150*c*, 150*d*, 150*i*, 150*j*). By contrast, in this particular drawing, to make the relay concept clearer, the airborne RF-head relay platform (101) is shown in a form that is configured only to relay between two airborne platforms.

Such airborne RF-head relay platforms can, in some embodiments, contain the full functionality as their corresponding airborne RF-head platforms, plus additional relay functionality. Alternatively, in some embodiments, the airborne RF-head relay platforms can be more specialized for interplatform relay applications. In order to make the distinction between airborne RF-head platforms and airborne RF-head relay platforms clearer, FIG. 4 shows an embodiment where the airborne RF-head relay platform (101) is specialized for just interplatform relay applications.

In this embodiment, the system can further comprise at least one airborne RF-head relay platform (101). This airborne RF-head relay platform can, depending on the embodiment, relay either laser signals or RF digitized wireless signals, or both, between one airborne platform (such as 100*b*) and another airborne platform (such as 100*a*). This lets a BBU (300) that might normally only be able to establish contact with airborne platform (100b) further (by way of the airborne relay 101) establish contact with normally out-of-range airborne platform (100a), and in turn further establish communications between user equipment (UE 150i and 150j) and BBU (300) that might not otherwise be possible.

The airborne RF-head relay (101) can operate by relaying laser signals, wireless RF signals, or both, between different airborne RF-head platforms (100b, 100a). Thus various types of airborne RF-head relays are possible.

In one embodiment, the airborne RF-head relay platform (101) can comprise at least one RF head and antenna configured to act as at least one interplatform relay for wireless RF) signals. In another embodiment, the airborne RF-head relay platform can comprise at least one laser communication link configured to act as at least one interplatform relay for laser signals. In some embodiments, the airborne RF-head relay can be configured to perform either laser or wireless signal relay functions. Thus in any of these configurations, the various RF-head relay platforms (101) can be configured to connect to at least one different airborne RF-head platform (e.g. 100b, 100a) by any of a platform-to-platform laser communications link (401a, 401b) or a platform-to-platform RF link (also designated as 401a, 401b).

Thus airborne RF-head relay platform (101) can be configured to receive Rx digitized-waveform data (for example from airborne platform 100b via 401a) and in turn relay (retransmit) this Rx digitized-waveform data as Tx digitized-waveform data to at least one different airborne RF-head relay platform (such as airborne platform 100a via 401b).

Note that in some embodiments, it is useful to configure the "standard" airborne RF-head platform to also serve as an airborne RF-head relay platform. This allows for greater system flexibility. Here, for example, when the platform is a balloon, if an airborne RF-head platform drifts out of direct laser communications range with a particular BBU ground station (300), if it is in communication range with other airborne RF-head platforms, it can still function by acting as an airborne RF-head relay platform, and also still communicate with various within-range UE as well.

To do this, in some embodiments, the airborne RF-head relay platform (101) can be further configured to transmit Tx RF waveform signals to and receive Rx RF waveform signals from at least one user equipment (UE). Here, for example, in FIG. 4, assume that airborne RF-head platforms (100b) and (100a) are both configured to also act as airborne RF-head relay platforms as well. In this case, (100b) and (100a) would also be airborne RF-head relay platforms, and these can relay signals back and forth to each other even without (101) (assuming that 100a and 100b are within communications range of each other).

Here, this can be achieved by configuring the airborne RF-head relay platform's (here assume that this is FIG. 4, 100a) at least one RF head and antenna to receive Rx RF waveform signals from the various user equipment (such as 150i, 150j), convert these wireless signals to relay Rx digitized-waveform data, and transmit (401b) this relay Rx digitized-waveform data to a different airborne RF-head relay platform (here assume direct transmission to 100b), and use the different airborne RF-head relay platform (100b) to transmit (400) this relay Rx digitized-waveform data to the baseband unit (300).

The airborne RF-head relay platform (here 101) can be also configured to relay Tx digitized-waveform data transmitted (400) from a baseband unit (300) to the user equipment (150i, 150j) by using a different airborne RF-head relay platform (here 100b) to relay this Tx digitized-waveform data (400) to a different airborne RF-head relay platform (100a), and use this different airborne RF-head relay platform (100a) to convert the Tx digitized-waveform data to Tx RF waveform signals, and transmit these Tx RF waveform signals to the various user equipment (150i, 150j).

If air-to-air wireless relay communications links are used, often it will be convenient to continue to send the wireless relay data as I/Q type digitized RF-waveforms using an RF-carrier to send the data. This is a bit tricky. That is, in some situations, a wireless RF-carrier signal can be used to send I/Q type digital data reporting on other wireless waveforms. Keep in mind that the data "payload" is the I/Q data, and we are merely discussing the best communications medium (e.g. laser or wireless) to use to relay this I/Q data payload.

However, for the airborne RF-head relay platform (101), we can use laser signals to relay the data. That is, (401a and 401b) can be laser signals. However there are other possibilities, and (401a and 401b) can be wireless signals. In this case, I/Q data are relayed using a wireless (RF) communications medium. Since this relay (101) will often be a line-of-site between various high altitude airborne platforms (100b, 100a), it may be convenient to use higher (e.g. >10 GHz) frequency wireless signals, such as in the unlicensed 60 GHz industrial, scientific, and medical (ISM) band, for such purposes. Use of other licensed "5G" high-frequency bands, such as the 28 GHz, 37 GHz, 39 GHz may also be used.

More Detailed Discussion of the Airborne RF-Head Platform (100)

FIG. 5 shows further details of one embodiment of the airborne RF-head platform (100), here focusing on some of the RF-head (200) and platform (104) control electronics.

FIG. 5 shows an embodiment where the RF head platform (200) comprises a plurality of RF heads (200a, 200b, 200c) connected to a plurality of antennas (242a, 242b, 242c). Here the RF head comprises a platform processor (210) (here the term "processor" is intended to be interpreted as "at least one processor"), suitable digital to analog D/A) and analog to digital (A/D) converters (212a, 212b, 212c) (which can be digital I/Q to analog converters), RF frequency up/down converters, RF amplifiers, and the like.

In FIG. 5, two of the lower RF heads 200b and 200c are each configured with their own antennas (242b, 242c) to enable MIMO or phase-array beam steering by allowing the BBU processor (see FIG. 6), with optional assistance from the platform processor (210), to control the relative phases of the wireless RF waveforms (130b1, 130c1 emitted by antenna 242b and antenna 242c to localize the sensitivity of the antennas, and any transmitted wireless waveforms, to the spatial location of the same UE (here smartphone 150m). By contrast, the top RF head (200a) is configured to use the same physical antenna (242a) to communicate with two different UE (smartphones 150k and 150L) using two different types of wireless waveforms, such as 4G and 5G wireless waveforms. The platform processor (210) is in turn configured to communicate this data to the BBU (300) using the laser communications link (400), and link interface (410), which in turn controls at least one platform laser link hardware (laser transmitter, receiver, and optional pointing apparatus 412).

Thus in some embodiments, the airborne RF-head system (100) can comprise at least one airborne RF-head platform (200) comprising a plurality of RF heads (200a, 200b, 200c), and an airborne platform (104) comprising any of a mobile balloon or aircraft device configured to operate within earth's atmosphere. Generally, most or all of the various RF heads (200*a*, 200*b*, 200*c*) will be connected to at least one antenna (242*a*, 242*b*, 242*c*). This plurality of RF heads is usually further configured (often by way of platform processor 210) to connect to at least one baseband unit (BBU 300) by a laser communications link (400), often by way of devices (410 and 412).

The airborne RF-head system will typically be configured to receive Rx RF waveform signals from at least one user equipment (UE, such as 150*k*, 150L, 150*m*) by using the at least one antenna (e.g. 242*a*, 242*b*, 242*c*) and various RF heads (e.g. any of 200*a*, 200*b*, 200*c*) to receive the Rx RF waveform signals (here shown as 130*a*1, 130*a*2, 130*b*1, 130*b*2), convert to Rx digitized-waveform data, and to transmit this Rx digitized-waveform data directly or indirectly to the baseband unit (300) using the laser communications link (400, 410, 412).

The airborne RF-head system (100) is also configured to transmit Tx RF waveform signals from the at least one baseband unit (300) to the user equipment (150*k*, 150L, 150*m*) by using the at least one baseband unit (300) to create Tx digitized-waveform data, and transmit this Tx digitized-waveform data directly or indirectly from the baseband unit (300) to the airborne RF-head platform (100) using the laser communications link (400, 410, 412). The airborne RF-head system is also configured to use at least one RF-head (e.g. any of 200*a*, 200*b*, 200*c*) and at least one antenna (e.g. 242*a*, 242*b*, 242*c*) (and other components as well, such as the platform processor, D/A and A/D converters 212*a*, 212*b*, 212*c*, and other equipment) to convert the Tx digitized-waveform data to Tx RF waveform signals, and transmit these Tx RF waveform signals (again, any of 130*a*1, 130*a*2, 130*b*1, 130*c*1) to the various user equipment (e.g. 150*k*, 150L, 150*m*).

Although the physical antennas (242*a*, 242*b*, 242*c*) can be narrowband antennas able to accommodate a narrower range of frequencies, such as about 1 GHz bandwidth or less from a base frequency, for greater flexibility, in some embodiments these antennas can be wideband antennas able to accommodate a broader range of frequencies such as 1 GHz or more from a base frequency. Here the physical antennas can be (242*a*, 242*b*, 242*c*) configured with their own, antenna specific, wideband converters. These converters can include high speed and wideband analog to digital (A/D) and digital to analog (D/A) converters. Examples of such converters include the Texas Instruments TI ADC12Dxx00RF family, Fujitsu Microelectronics America, Inc. A/D converters, or other type of converters. In general, a wide range of different analog to digital and digital to analog converters, preferably configured to operate at GHz speeds in excess of 1 billion samples per second, may be used, with higher performance (greater A/D bits resolution and/or greater sampling rates) wideband converters generally being preferable.

In some embodiments, the converters may be other types of converter devices, such I/Q modulators and demodulators, QAM modulators and demodulators, and the like. I/Q modulation and demodulation methods allow digital data to be transformed to and from waveforms suitable for wireless transmission. In the I/Q scheme, modulation is represented in an I vs Q plane where the I axis corresponds to the in-phase component of a waveform, and Q represents the quadrature component of a waveform. I/Q modulators and demodulators can be digital devices that can accept digital I and Q input data and, for example, output or receive RF QAM waveforms as a result, and vice versa. Alternatively, the I/Q modulators can be analog devices, but work with I and Q data that has been converted to and from analog I and Q values using suitable analog to digital or digital to analog converters. For simplicity, here we will classify I/Q modulators and demodulators as another type of converter that can transform digital representation of RF waveforms from the digital domain of the system's processors, and the analog domain of the various RF wireless waveforms transmitted and received by the system's various antennas.

Examples of digital I/Q modulators include the work of Bode et. al., U.S. Pat. No. 7,680,210, and Yoon, US patent publication 20 060023811 the entire contents of both of which are incorporated herein by reference Examples of analog I/Q modulators which may interface with suitable wideband analog to digital converters, include the Linear Technology LTC55888-1 200 MHz to 6000 MHz Quadrature Modulator with Ultrahigh OIP3, and similar types of devices.

In addition to serving as an airborne RF-head, the airborne RF-head platform must perform a number of other functions as well, including functions to assist in locating the position and orientation of the airborne platform, platform control, platform power management, and other functions.

The airborne platform will often contain various location sensors, such as at least one GPS receiver, and the like. The airborne platform may also contain various orientation sensors, which may be magnetic field sensors to sense the orientation of the airborne platform with regards to the earth's magnetic field, accelerometers, light sensors, cameras (e.g. determine orientation using images of the ground or the sun, moon, planets, or stars), and the like. The airborne platform may also contain one or more actuators to allow at least some control over any of the location of the platform and/or the orientation of the various antennas or laser communications link. If the platform is an unmanned heavier than air vehicle, such as a solar-powered drone, these actuators might also control the speed of any propellers, orientation of any flaps, and the like.

FIG. 5 shows some of the devices needed to perform some of these additional functions as well. Specifically in some embodiments, the airborne RF-head platform (100) can be further configured to use various location/position sensors and orientation sensors (120) to determine the platform location (this can be in altitude as well as latitude/longitude) and platform orientation (e.g. orientation of the platform RF-head (200) and antennas (242) relative to the compass directions or other established direction). Often, to assist the BBU (300), the airborne RF-head platform (100, usually using the platform processor 210) can be further configured to transmit at least some of this platform location information and platform orientation information to the BBU (300), usually by the laser link (400).

As can be seen from FIG. 5, typically the airborne RF-head platform (100) is further configured with at least one platform processor (210). This platform processor can be configured to receive commands from the BBU (300) (often using laser link 400) to alter various platform functions. For example, the position or orientation of the airborne RF-head platform (100) or its various antennas (242) can be altered using various actuators (122, 124).

The airborne platform (100) will typically comprise other devices and perform other functions as well. The airborne platform will typically also include devices for obtaining and storing power, such as suitable solar photovoltaic cells and rechargeable batteries (202, 126).

In some embodiments, the airborne platform's platform processor (210) may take on at least some of the burden of managing power, sensor location and orientation data analysis, and managing suitable actuators so as to keep the location of the airborne platform, the various antennas, and the laser communications link in a correct configuration. Often, however, at least some of the burden of managing these functions may be assumed by the baseband unit (BBU 300) (or other external control system). To do this the platform processor (210) may be configured to transmit platform status data (e.g. power data, sensor location and orientation data, actuator status) to an external control system (here assumed to be part of the baseband unit 300) using the laser communications link (400) or other methods. The platform processor (210) may also be configured to receive commands from the baseband unit (300) to manage power, activate or inactivate actuators, switch antenna configurations, and the like.

Note that FIG. 5 shows a focused beam MIMO configuration (200b, 242b, 200c, 242c) that can be configured to better focus the platform's various antennas onto specific locations (132a, 132b, 132c 132d), such as was shown previously in FIG. 2. To support such MIMO operation, in some embodiments, the at least one baseband unit (300) may be further configured to send and receive multiple streams of Rx digitized-waveform data and Tx digitized-waveform data to implement a MIMO configuration configured to enable the airborne RF-head platform to use MIMO beam focusing techniques to simultaneously communicate with multiple spatially distributed user equipment over any of a same or different RF communications channel.

Similarly, consider FIG. 3, which was previously discussed. In that example, multiple airborne RF-head platforms (100b, 100c) were cooperating to send and receive information from the user equipment (150e) that located on the communications boundary between the platforms. Here the BBU (300) was shown helping to manage this cooperation.

In such a case, a plurality of airborne RF-head platforms is being used to communicate with a plurality of user equipment (150a, 150b, 150c, 150e, 150f, 150g, 150h) distributed over different spatial locations. To support this, one or more baseband units (300) can be configured to send multiple streams of Rx digitized-waveform data and Tx digitized-waveform data to implement a plurality of MIMO configurations over a plurality of airborne RF-head platforms. More specifically, the BBU will be configured to implement a coordinated multipoint (CoMP) configuration where at least some of the plurality of user equipment (here 150e) simultaneously exchanges Rx RF waveform and Tx RF waveform signals a plurality of airborne RF-head platforms (here 100b and 100c).

Consider also FIG. 4, and the airborne RF-head relay platform discussion. As previously discussed, in some embodiments, at least one airborne RF-head platform can be further configured to also function as an airborne RF-head relay platform. Here, for example, at least one RF head and antenna (242) can be configured to act as at least one interplatform relay (e.g. like 101), or alternatively or additionally, at least one laser communication link can be configured to act as at least interplatform relay (again like 101).

As previously discussed, this airborne RF-head relay platform can be configured to connect to at least one different airborne RF-head relay platform by any of a platform-to-platform laser communications link or a platform to platform RF link. Further, the airborne RF-head relay platform (100) can also be configured to receive any of relay Rx digitized-waveform data and relay Tx digitized-waveform data, and to relay this relay Rx digitized-waveform data and Tx digitized-waveform data to at least one different airborne RF-head relay platform;

Additionally, however, and in distinction to the FIG. 4 example (101), the more capable and often preferred airborne RF-head relay platform can also be configured to transmit Tx RF waveform signals to and receive Rx RF waveform signals from at least one user equipment (UE). So this version both acts as a relay, and is also capable of communicating directly with the user equipment.

This more capable airborne RF-head relay platform can be implemented by configuring at least one RF head and antenna to receive Rx RF waveform signals from the various user equipment, and relay the corresponding Rx digitized-waveform data and transmit relay Rx digitized-waveform data a different airborne RF-head relay platform. The system can then use this different airborne RF-head relay platform to transmit the relay Rx digitized-waveform data to the baseband unit (300).

The more capable airborne RF-head relay platform can also be configured to transmit Tx digitized-waveform data from the baseband unit(s) (300) to the various user equipment by using the airborne RF-head relay platform to relay the Tx digitized-waveform data to a different airborne RF-head relay platform, and then use the different airborne RF-head relay platform to convert the Tx digitized-waveform data to Tx RF waveform signals, and finally transmit the resulting Tx RF waveform signals (e.g. wireless signals) to the appropriate user equipment.

More Detailed Discussion of the Baseband Unit (BBU 300)

Figure 6:
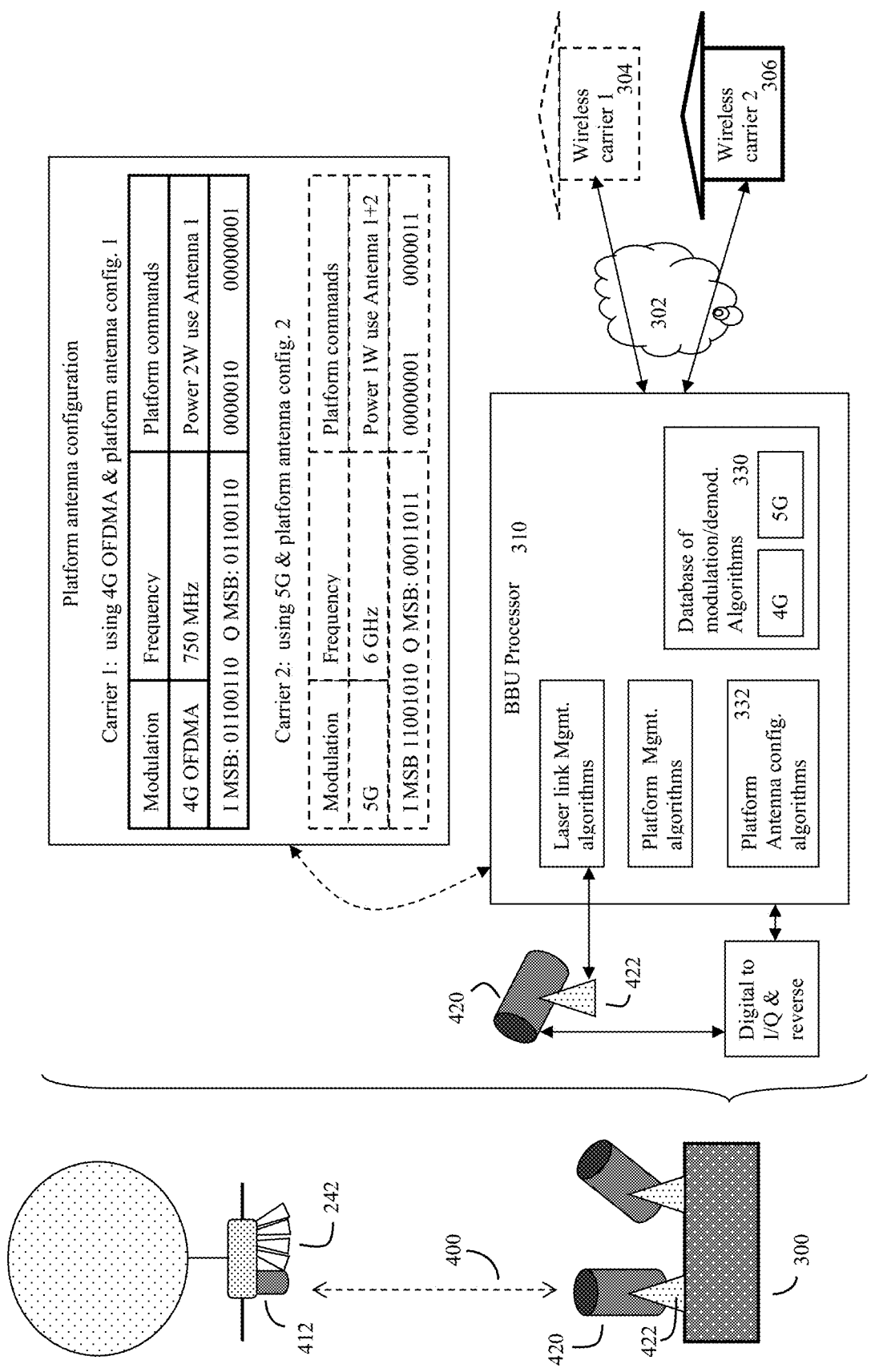
FIG. 6 shows further details of the system's baseband unit.

FIG. 6 shows further details of the system's baseband unit (300). This unit will typically comprise a baseband unit processor (310), often connected to a computer network such as the internet (302), or directly or indirectly to one or more various wireless carriers (304, 306). The baseband unit will also comprise one or more laser communications links (400). In this example, the laser link is shown as an actuator mounted BBU telescope (420) comprising a laser and photodetector. The BBU actuators (422), usually also under BBU processor control (310), can be used to control the orientation of the laser communication link (400). The BBU processor (310) can also be used to transmit and receive data over the laser communications link.

As previously discussed, the BBU processor (310) and associated memory can typically be configured to implement various software-defined radio schemes, such as previously discussed methods of Harris and other wireless (radio) schemes. Other software defined radio methods that may be employed include the previously discussed work of Tan et. al., U.S. Pat. No. 8,565,811; Ting et. al., U.S. Pat. No. 7,151,925; March et. al., U.S. Pat. No. 8,050,708; and Naik et. al., U.S. Pat. No. 8,571,119 and other software defined radio methods. The BBU processor(s) will often comprise various types of high-performance digital signal processors and the like, as well as more standard general purpose processors (e.g. x86, ARM, MIPS other processor types) as needed.

The BBU processor (310) will typically be configured with a database of various modulation and demodulation algorithms (330) configured to perform nearly all of the functions of a software-defined radio system, with the exception of the functions implemented at the various airborne RF-head platforms.

In some embodiments, the BBU processor (310) can use its database of modulation and demodulation algorithms (330) and antenna configuration algorithms (332) and the input digital data packets or frames from the internet (302) or various wireless carriers (304, 306) to digitally convert the various transmitted digital data packets or frames to digital RF output (e.g. digital RF waveforms in I/Q format, or digitized RF waveforms, also called Tx I/Q data), and then transmit this digital RF output (Tx I/Q data) to the appropriate airborne RF-head platforms (100) using the laser communications link (400). These platforms (100) can then transmit the wireless waveform signals to the various user equipment (UE) (150).

Similarly, the airborne RF-head platforms (100) can receive wireless waveforms from the various UE (150), digitize this, and send the digitized (e.g. Rx I/Q data) over the laser link (400) back to the BBU processor (310), where it can be demodulated, payload data extracted, and the payload data (e.g. UE voice signal UE data) sent over various computer networks (302) (such as the internet) back to various wireless carriers such as (304, 306).

More specifically, in some embodiments, the BBU (300) can comprise a BBU processor (310), and at least one laser communications link (400, 420, 422). The BBU processor will typically be configured to use the one or more laser communications links (400, 420, 422) to communicate with various airborne RF-head platforms (100). (As before, these airborne RF-head platforms will typically comprise at least one RF head 200, and any of a mobile balloon or aircraft device 104 configured to operate within earth's atmosphere).

The baseband unit (300) will typically be configured to use the BBU processor (310) and at least one laser communications link (400, 420, 422) to receive Rx digitized-waveform data corresponding to Rx RF waveform signals originally transmitted by at least one user equipment (UE, see FIG. 5 150k, 150L, 150m) to one or more airborne RF-head platforms (100). As before, assume that at the airborne RF-head platform, these signals were converted from Rx RF (wireless) waveforms to Rx digitized-waveform data. This Rx digitized-waveform data was then transmitted (by the relevant airborne RF-head platform) to the baseband unit (300) using the laser communications link (400).

The baseband unit's BBU processor (310) is configured to use the laser communications link (400) to transmit (or upload) Tx digitized-waveform data to be received by the various (UE—see FIG. 5, 150k, 150L, 150m) as Tx RF waveform signals. This is done by using the at least one laser communications link to first transmit this Tx digitized-waveform data the relevant airborne RF-head platform(s), where it is converted (see FIG. 5) from Tx digitized-waveform data to Tx RF waveforms, and then retransmitted by the relevant airborne RF-head platform(s) to the user equipment using at least one RF-head (e.g. 200a, 200b, 200c) and at least one antenna (e.g. 242a, 242b, 242c).

Keep in mind that according to the invention, nearly all of the responsibility for compensating for speed-of-light and distance effects, Doppler effects, precise timing, antenna orientation and configuration, and the like is done remotely at the BBU (300), rather than at the airborne RF-head platform. This places a much higher than average burden on the BBU processor (310) to properly configure its various software-defined radio algorithms to correct for these various effects. Often, to properly adjust the software-defined radio calculations, the BBU processor (310) will need information such as the position and orientation of the airborne RF-head platform (100), and it may also need to estimate at least the position of the various UE (150) relative to the airborne RF-head platform (100) and the orientation of the various airborne RF-head platform antennas (242).

The BBU processor (310) can be configured to automatically use information previously obtained on the location of the various user equipment (UE e.g. mobile phones), as well as its database of modulation and demodulation algorithms (330), and its database of airborne RF-head platform antenna configuration algorithms (332) to create RF waveforms for the various 3G, 4G, 5G etc. user equipment. The BBU processor can be configured to transmit digitized (e.g. I/Q versions) versions of these waveforms to the airborne RF-head platform for subsequent transmission as Rx RF waveform signals.

At the airborne RF-head platform (100), the platform can then use the previously discussed Digital to Analog converters (212a, 212b, 212c) (or other types of converters) to simultaneously transmit both waveforms using the platforms various antennas (see for example, 242a transmitting waveforms 130a1 to UE (150k), and waveforms 130a2 to UE (150L). The BBU processor (310) can also use its antenna configuration algorithms (402) to adjust the phases of the input or output RF signals over the various antennas so as to steer the beam directions towards a desired user equipment location.

Put alternatively, the BBU processor (310) will often be further configured to use the laser communications link (400) to obtain platform location (and often also orientation) of various airborne RF-head platforms (e.g. FIG. 3 100b, 100c), thus obtaining platform location information. Here assume that platform "location" information can also comprise platform orientation information as well.

For purposes of software-defined radio calculations, the BBU processor (310) can use information pertaining to the baseband unit's location (here termed BBU location information) in it various calculations. For example, the BBU processor (310) can be configured to use this BBU location information and the platform location information to determine useful information such as the platform-to-BBU distance information. The BBU processor can use this to help adjust various software-defined radio calculations for waveform changes or timing changes due to speed-of-light time delays, Doppler frequency shifts, correct for changes in the orientation of the airborne RF-head platform's antennas (242), and the like.

More specifically, the BBU processor can be further configured to use the platform-to-BBU distance information to adjust any of its Rx digitized-waveform data or Tx digitized-waveform data to correct for variations in the platform-to-BBU distance between the various airborne RF-head platforms (e.g. 100a, 100b, 100c) and the baseband unit (300).

In some embodiments, the BBU processor can be further configured to use the laser communications link (400) to determine or obtain the orientation of the airborne RF-head platform (e.g. which way the various antennas (242) are pointing relative to compass locations, thus producing platform orientation information. In the cases where the airborne RF-head platform antennas (242) can be configured to be directional antennas, the platform orientation information, plus information pertaining to the directionality of the antennas (242) can be used by the BBU processor to help determine a likely location of any user equipment (150) communicating with the airborne processor. This, in turn, can be used by the BBU processor to further adjust its various software-defined radio, MIMO, and CoMP algorithms.

Here, the BBU processor (310) can be further configured to use any of Rx digitized-waveform data or Tx digitized-waveform data, the BBU location information, the platform location information, and the platform orientation information to determine a location of the various user equipment of interest (150), thus producing user equipment location information. Additionally, the BBU processor (310) can be further configured to adjust any of its Rx RF digitized-waveform data or Tx RF digitized-waveform data to correct for variations in the location and/or orientation between the various airborne RF-head platforms (100*a*, 100*b*, 100*c*) and the various user equipment (150).

Similarly, in situations such as FIG. 2 and FIG. 5, where the airborne RF-head platform may be configured with a plurality of RF heads (200*a*, 200*b*, 200*c*) and a plurality of antennas (242*a*, 242*b*, 242*c*) (and the RF heads are connected to at least one of these antennas). The BBU processor (310) may be further configured to send and receive multiple streams of Rx digitized-waveform data and the Tx digitized-waveform data to implement a MIMO configuration (for example, FIGS. 2 132*a*, 132*b*, 132*c*, and 132*d*), as well as FIGS. 5 200*b*, 242*b*, 130*b*1, and 200*c*, 242*c*, and 130*c*1) configured to enable the airborne RF-head platform to use MIMO beam focusing techniques to simultaneously communicate with multiple spatially distributed user equipment (see FIG. 2 150*a*, 150*b*, 150*c*, 150*d*) over any of a same or different RF communications channel.

Similarly, to support CoMP functionality, in cases where there are a plurality of airborne RF-head platforms (100*b*, 100*c*) communicating with a plurality of user equipment (see FIG. 3, 150*a*, 150*b*, 150*c*, 150*e*, 150*f*, 150*g*, 150*h*) distributed over different spatial locations, the BBU must also assume most of the computational burden of managing this situation.

Here, the BBU processor (310) can be configured to send multiple streams of Rx digitized-waveform data and Tx digitized-waveform data to implement a plurality of MIMO configurations over the various airborne RF-head platforms (e.g. 110*b*, 100*c*) so as to implement a coordinated multi-point (CoMP) configuration. In this configuration, at least some of the user equipment (e.g. 150*e*) simultaneously exchanges Rx RF waveform and Tx RF waveform signals with a plurality of different airborne RF-head platforms (e.g. 100*b*, 100*c*).

In some embodiments, the invention may also use certain techniques from U.S. patent application Ser. No. 15/187,671 "SYSTEM AND METHOD FOR PROVIDING WIRELESS COMMUNICATION SERVICES USING CONFIGURABLE BROADBAND INFRASTRUCTURE SHARED AMONG MULTIPLE NETWORK OPERATORS", filed Jun. 20, 2016, and its U.S. provisional patent application 62/181,691, "SYSTEM AND METHOD FOR DEFINING AND SHARING BROADBAND VIRTUAL ANTENNA ARRAYS ACROSS MULTIPLE USERS", filed Jun. 18, 2015. The entire contents of U.S. patent application Ser. No. 15/187,671 and 62/181,691 are incorporated herein by reference.

For example, in some embodiments, a first wireless carrier (304) can transmit configuration information to the BBU processor specifying (in digital form) that the first carrier wishes configure the airborne RF-head platform system to communicate to various user equipment (UE) using a 4G OFDMA modulation scheme at 750 MHz. The airborne' platform's transmitter power and antenna configuration can also be specified. The BBU processor (310) will, in turn, take data from the first wireless carrier (304), use software-defined radio to compute the appropriate RF modulation scheme, and send a digitized (e.g. Tx I/Q and Rx I/Q data) version of the corresponding RF waveforms, and corresponding platform configuration commands over the laser link (400) to the appropriate airborne RF-head platform (100). This enables, for example, various wireless carriers (e.g. 304, 306) to use the system as a type of air-based configurable broadband infrastructure that can be shared across multiple service providers if desired.

The invention claimed is:

1. An airborne RF-head system, comprising:
at least one airborne RF-head platform comprising at least one RF (radiofrequency) head, and an airborne platform comprising any of a mobile balloon or aircraft device configured to operate within earth's atmosphere;
said at least one RF head connected to at least one antenna;
said at least one RF head further configured to connect to at least one baseband unit (BBU) by at least one laser communications link;
said airborne RF-head system configured to receive Rx RF waveform signals from at least one user equipment (UE) by using said at least one antenna and said at least one RF head to receive said Rx RF waveform signals, convert to Rx digitized-waveform data, and to transmit said Rx digitized-waveform data directly or indirectly to said at least one baseband unit using said at least one laser communications link, and
said airborne RF-head system configured to transmit Tx RF waveform signals from said at least one baseband unit to said at least one user equipment by using said at least one baseband unit to create Tx digitized-waveform data, and transmit said Tx digitized-waveform data directly or indirectly from said at least one baseband unit to said at least one airborne RF-head platform using said at least one laser communications link, and use said at least one RF head and said at least one antenna to convert said Tx digitized-waveform data to Tx RF waveform signals, and transmit said Tx RF waveform signals to said at least one user equipment.

2. The system of claim 1, wherein said at least one baseband unit is configured to use said laser communications link to obtain a platform location of said at least one airborne RF-head platform, thus obtaining platform location information;
wherein said at least one baseband unit has a BBU location, and corresponding BBU location information, and said at least one baseband unit is configured to use said BBU location information and said platform location information to determine at least at least platform-to-BBU distance information;
said at least one baseband unit is further configured to use said at least platform-to-BBU distance information to adjust any of its Rx digitized-waveform data or Tx digitized-waveform data to correct for variations in at least said platform-to-BBU distance between said at least one airborne RF-head platform and said at least one baseband unit.

3. The system of claim 2, wherein said at least one baseband unit is further configured to use said laser communications link to obtain an orientation of said at least one airborne RF-head platform, thus producing platform orientation information;
wherein said at least one baseband unit is further configured to use any of said Rx digitized-waveform data or Tx digitized-waveform data, said BBU location information, said platform location information, and said platform orientation information to determine a location of said at least one user equipment, thus producing user equipment location information;

wherein said at least one baseband unit is further configured to adjust any of its Rx digitized-waveform data or Tx digitized-waveform data to correct for variations in any of location and orientation between said at least one airborne RF-head platform and said at least one user equipment.

4. The system of claim 1, wherein said at least one baseband unit is configured to implement a plurality of laser communications links to a plurality of said at least one airborne RF-head platforms.

5. The system of claim 1, wherein said at least one airborne RF-head platform is configured with a plurality of RF heads and a plurality of antennas, at least some of said RF heads connected to at least one of said plurality of antennas.

6. The system of claim 5, wherein said at least one baseband unit is further configured to send and receive multiple streams of said Rx digitized-waveform data and said Tx digitized-waveform data to implement a MIMO (multiple-input and multiple output) configuration configured to enable said at least one airborne RF-head platform to simultaneously communicate with multiple spatially distributed user equipment over any of a same or different RF communications channel.

7. The system of claim 5, wherein said at least one airborne RF-head platform comprises a plurality of airborne RF-head platforms, said at least one user equipment comprises a plurality of user equipment distributed over different spatial locations;
said at least one baseband unit is configured to send multiple streams of Rx digitized-waveform data and said Tx digitized-waveform data to implement a plurality of MIMO (multiple-input and multiple output) configurations over said plurality of airborne RF-head platforms so as to implement a coordinated multipoint (CoMP) configuration where at least some of said plurality of user equipment simultaneously exchanges Rx RF waveform signals and Tx RF waveform signals with more than one of said plurality of airborne RF-head platforms.

8. The system of claim 1, wherein said at least one airborne RF-head platform is further configured as at least one airborne RF-head relay platform, further comprising any of either:
a) at least one RF head and antenna configured to act as at least one interplatform relay;
b) said at least one laser communication link configured to act as at least one interplatform relay;
said at least one airborne RF-head relay platform configured to connect to at least one different airborne RF-head platform by any of a platform-to-platform laser communications link or a platform-to-platform RF link;
said at least one airborne RF-head relay platform configured to receive any of relay Rx digitized-waveform data and relay Tx digitized-waveform data, and to relay said relay Rx digitized-waveform data and Tx digitized-waveform data to at least one different airborne RF-head platform.

9. The system of claim 8, wherein said at least one airborne RF-head relay platform is further configured to transmit Tx RF waveform signals to and receive Rx RF waveform signals from at least one user equipment (UE) by configuring said at least one RF head and antenna to receive said Rx RF waveform signals from said at least one user equipment, convert to relay Rx digitized-waveform data, transmit said relay Rx digitized-waveform data to a different airborne RF-head relay platform, and use said different airborne RF-head relay platform to transmit said relay Rx digitized-waveform data to said at least one baseband unit;
and transmit Tx digitized-waveform data from said at least one baseband unit to said user equipment by using a different airborne RF-head relay platform to relay said Tx digitized-waveform data to a different airborne RF-head relay platform, and use said different airborne RF-head relay platform to convert said Tx digitized-waveform data to Tx RF waveform signals, and transmit said Tx RF waveform signals to said at least one user equipment.

10. The system of claim 1, wherein said at least one RF-head comprises any of power amplifiers, analog to digital converters, digital to analog converts, frequency down converters, and frequency up converters.

11. An airborne RF-head system, comprising:
at least one airborne RF-head platform comprising a plurality of RF (radiofrequency) heads, and an airborne platform comprising any of a mobile balloon or aircraft device configured to operate within earth's atmosphere;
said RF heads connected to at least one antenna;
said plurality of RF heads further configured to connect to at least one baseband unit (BBU) by at least one laser communications link;
said airborne RF-head system configured to receive Rx RF waveform signals from at least one user equipment (UE) by using said at least one antenna and said RF heads to receive said Rx RF waveform signals, convert to Rx digitized-waveform data, and to transmit said Rx digitized-waveform data directly or indirectly to said at least one baseband unit using said at least one laser communications link; and
said airborne RF-head system configured to transmit Tx RF waveform signals from said at least one baseband unit to said at least one user equipment by using said at least one baseband unit to create Tx digitized-waveform data, and transmit said Tx digitized-waveform data directly or indirectly from said at least one baseband unit to said at least one airborne RF-head platform using said at least one laser communications link, and use at least one RF-head and at least one antenna to convert said Tx digitized-waveform data to Tx RF waveform signals, and transmit said Tx RF waveform signals to said at least one user equipment.

12. The system of claim 11, wherein said at least one airborne RF-head platform is further configured to use any of position sensors and orientation sensors to determine any of a platform location and platform orientation;
said at least one airborne RF-head platform further configured to transmit any of platform location information and platform orientation information to said at least one baseband unit.

13. The system of claim 11, wherein said at least one airborne RF-head platform is further configured with at least one platform processor, said at least one platform processor configured to receive commands from said at least one baseband unit to alter any of a position or orientation of said airborne RF-head platform and a position or orientation of said at least one antenna.

14. The system of claim 11, wherein said at least one baseband unit is further configured to send and receive multiple streams of said Rx digitized-waveform data and said Tx digitized-waveform data to implement a MIMO (multiple-input and multiple output) configuration configured to enable said at least one airborne RF-head platform to simultaneously communicate with multiple spatially distributed user equipment over any of a same or different RF communications channel.

15. The system of claim 11, wherein said at least one airborne RF-head platform comprises a plurality of airborne RF-head platforms, said at least one user equipment comprises a plurality of user equipment distributed over different spatial locations;

said at least one baseband unit is configured to send multiple streams of Rx digitized-waveform data and said Tx digitized-waveform data to implement a plurality of MIMO (multiple-input and multiple output) configurations over said plurality of airborne RF-head platforms so as to implement a coordinated multipoint (CoMP) configuration where at least some of said plurality of user equipment simultaneously exchanges Rx RF waveform and Tx RF waveform signals with more than one of said plurality of airborne RF-head platforms.

16. The system of claim 11, wherein said at least one airborne RF-head platform is further configured as at least one airborne RF-head relay platform, further comprising any of:

a) at least one RF head and antenna configured to act as at least one interplatform relay;

b) said at least one laser communication link configured to act as at least one interplatform relay;

said at least one airborne RF-head relay platform configured to connect to at least one different airborne RF-head relay platform by any of a platform-to-platform laser communications link or a platform-to-platform RF link;

said at least one airborne RF-head relay platform configured to receive any of relay Rx digitized-waveform data and relay Tx digitized-waveform data, and to relay said relay Rx digitized-waveform data and Tx digitized-waveform data to at least one different airborne RF-head relay platform; and wherein said at least one airborne RF-head relay platform is further configured to transmit Tx RF waveform signals and to receive Rx RF waveform signals from at least one user equipment (UE) by configuring said at least one RF head and antenna to receive said Rx RF waveform signals from said at least one user equipment, convert to relay Rx digitized-waveform data, transmit said relay Rx digitized-waveform data to a different airborne RF-head relay platform, and use said different airborne RF-head relay platform to transmit said relay Rx digitized-waveform data to said at least one baseband unit; and and transmit Tx digitized-waveform data from said at least one baseband unit to said user equipment by using an airborne RF-head relay platform to relay said Tx digitized-waveform data to a different airborne RF-head relay platform, and use said different airborne RF-head relay platform to convert said Tx digitized-waveform data to Tx RF waveform signals, and transmit said Tx RF waveform signals to said at least one user equipment.

17. The system of claim 11, wherein said at least one baseband unit comprises a BBU processor, and at least one laser communications link;

said BBU processor configured to use said at least one laser communications link to communicate with at least one airborne RF-head platform comprising said at least one RF head, said at least one airborne RF-head platform further comprising any of a mobile balloon or aircraft device configured to operate within earth's atmosphere;

said at least one baseband unit configured to use said BBU processor and said at least one laser communications link to receive Rx digitized-waveform data corresponding to Rx RF waveform signals originally transmitted by at least one user equipment (UE) from said at least one user equipment to said at least one airborne RF-head platform, where it was converted by said at least one airborne RF-head platform from Rx RF waveforms to Rx digitized-waveform data, said Rx digitized-waveform data then transmitted by said at least one airborne RF-head platform to said at least one baseband unit using said at least one laser communications link;

said at least one baseband unit further configured to use said BBU processor and said at least one laser communications link to transmit Tx digitized-waveform data to be received by said at least one user equipment (UE) as Tx RF waveform signals by using said at least one laser communications link to transmit said Tx digitized-waveform data to said at least one airborne RF-head platform, where it is converted by said at least one airborne RF-head platform from Tx digitized-waveform data to Tx RF waveforms, and then retransmitted by said at least one airborne RF-head platform to said at least one user equipment using said at least one RF-head and said at least one antenna;

said BBU processor further configured to use said at least one laser communications link to obtain a platform location of said least one airborne RF-head platform, thus obtaining platform location information;

wherein said at least one baseband unit has a BBU location, and corresponding BBU location information, and said BBU processor is configured to use said BBU location information and said platform location information to determine at least platform-to-BBU distance information;

said BBU processor further configured to use said at least platform-to-BBU distance information to adjust any of its Rx digitized-waveform data or Tx digitized-waveform data to correct for variations in at least said platform-to-BBU distance between said at least one airborne RF-head platform and said at least one baseband unit.

18. The system of claim 17, wherein said BBU processor is further configured to use said laser communications link to obtain an orientation of said at least one airborne RF-head platform, thus producing platform orientation information;

wherein said BBU processor is further configured to use any of said Rx digitized-waveform data or Tx digitized-waveform data, said BBU location information, said platform location information, and said platform orientation information to determine a location of said at least one user equipment, thus producing user equipment location information;

wherein said BBU processor is further configured to adjust any of its Rx RF digitized-waveform data or Tx RF digitized-waveform data to correct for variations in any of location and orientation between said at least one airborne RF-head platform and said at least one user equipment.

19. The system of claim 18, wherein said at least one airborne RF-head platform is configured with a plurality of said RF heads and plurality of said antennas, where said RF heads are connected to at least one of said antennas;

wherein said BBU processor is further configured to send and receive multiple streams of said Rx digitized-waveform data and said Tx digitized-waveform data to implement a MIMO (multiple-input and multiple output) configuration configured to enable said at least one airborne RF-head platform to use MIMO beam focusing techniques to simultaneously communicate with multiple spatially distributed user equipment over any of a same or different RF communications channel.

20. The system of claim 19, wherein said at least one airborne RF-head platform is a plurality of airborne RF-head platforms, said at least one user equipment is a plurality of user equipment distributed over different spatial locations;
wherein said BBU processor is configured to send multiple streams of Rx digitized-waveform data and said Tx digitized-waveform data to implement a plurality of MIMO configurations over said plurality of airborne RF-head platforms so as to implement a coordinated multipoint (CoMP) configuration where at least some of said plurality of user equipment simultaneously exchanges Rx RF waveform and Tx RF waveform signals with said plurality of airborne RF-head platforms.

\* \* \* \* \*